UNITED STATES PATENT OFFICE.

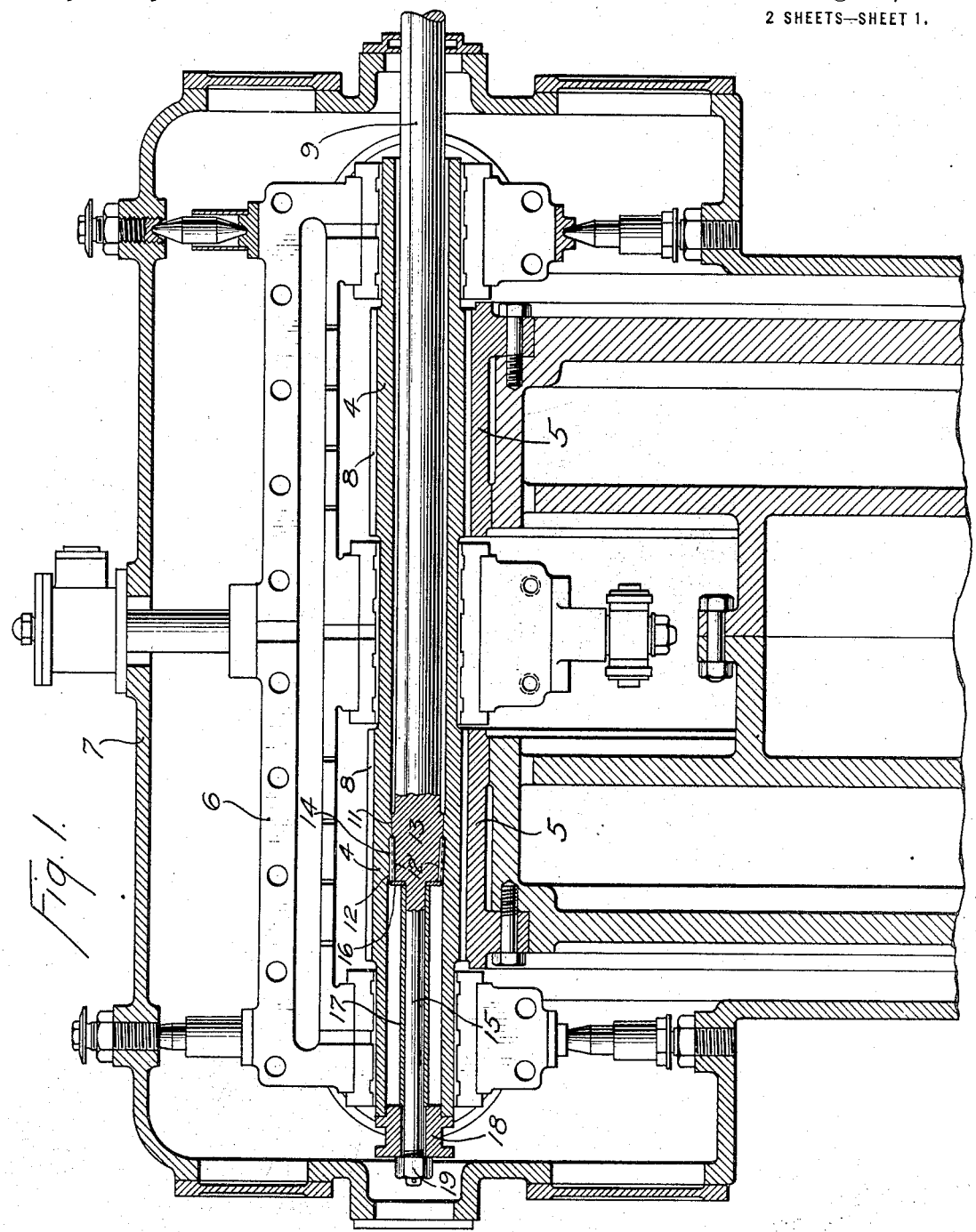

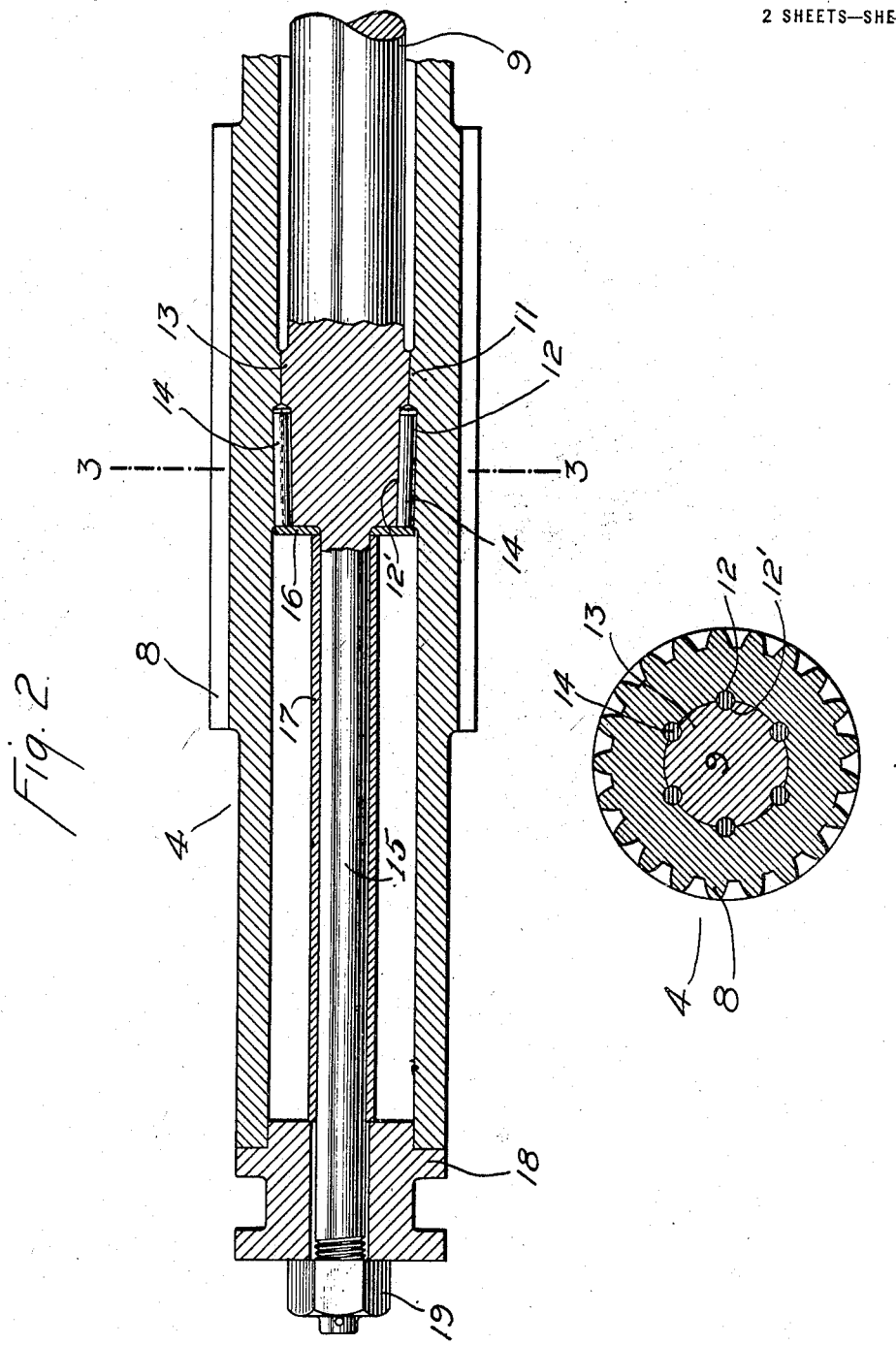

GEORGE WESTINGHOUSE, OF PITTSBURGH, PENNSYLVANIA; HENRY HERMAN WESTINGHOUSE, CHARLES A. TERRY, AND WALTER D. UPTEGRAFF EXECUTORS OF SAID GEORGE WESTINGHOUSE, DECEASED.

TRANSMISSION-GEARING.

1,149,881.  Specification of Letters Patent.  Patented Aug. 10, 1915.

Application filed November 29, 1913. Serial No. 803,772.

*To all whom it may concern:*

Be it known that I, GEORGE WESTINGHOUSE, a citizen of the United States, and a resident of Pittsburgh, in the county of Allegheny and State of Pennsylvania, have made a new and useful Invention in Transmission-Gearing, of which the following is a specification.

This invention relates to improvements in transmission gearing and particularly gearing adapted to be employed in the transmission of relatively high power, such, for example, as gearing employed in transmitting power from a turbine or other relatively high speed engine to the propeller shaft of a vessel.

An object of the invention is to produce an improved coupling or coupling means for one of the gears of the transmission gearing, which will reduce the elastic twist of the gear, due to the transmitted torque, below that encountered under the same conditions with an ordinary form of coupling such as is now employed.

I have found that it is desirable in heavy duty transmission gearing to so form the separate intermeshing gears that each gear is provided with two sets of axially alined gear teeth having the same pitch diameter, and spaced apart so that a supporting bearing may be employed between them if desired. Such an arrangement of teeth renders it possible to employ oppositely disposed sets of spiral gear teeth on each gear, and, as has been said, an intermediate bearing between the two sets of teeth on the pinion or smaller gear for the purpose of reducing the cross bending strains. Such a construction, however, increases the length of the gears and consequently the tendency of the pinion to distort spirally when subjected to torque, and inasmuch as the pinion is usually of relatively small diameter, an appreciable twist may occur under ordinary operating conditions, which would be objectionable, if special means were not employed to compensate for it, or to equalize tooth pressures along the teeth. The equalization or distribution of the tooth pressures along the teeth of the intermeshing gears has been effectively accomplished by employing a floating frame, or means permitting the pinion to move to different angular positions relatively to the axis of its coöperating gear and to thereby automatically equalize or distribute the tooth pressures along the teeth, during the operation of the mechanism. In such transmission gearing special means are employed, for coupling the pinion to the driving or the driven agent, so that the pinion is substantially free to move to the different angular positions; but in all gearing known to me the coupling means employed is secured to one end of the pinion, so that the pinion is subjected to maximum elastic twist throughout its length for each set of conditions encountered.

My present invention contemplates the production of a coupling means for the smaller gear or pinion, capable of being secured to the pinion at a point intermediate its ends so that the elastic twist of the pinion is reduced below what it would be under the same operating conditions with the pinion provided with an ordinary or usual form of coupling means.

It will, of course, be understood that my invention may be employed in connection with the larger gear of the transmission gearing, although the necessity for such an arrangement will seldom occur, since the greater diameter of the larger gear renders it possible to so construct the gear that it will not be appeciably or objectionably distorted when subjected to the ordinary torsional stresses encountered during operation. It will also be understood that various changes, substitutions, modifications, and additions may be made in the details of construction and in the arrangement of the apparatus illustrated as an embodiment of my invention, without departing from the spirit and scope of the invention as herein described, and as set forth by the claims appended hereto and forming a part hereof.

In the drawings accompanying and forming a part of this application: Figure 1 is a fragmental, sectional plan view of a transmission gearing embodying my invention. The pinion is shown in section so as to illustrate the coupling means herein illustrated as an embodiment of my invention; Fig. 2 is a fragmental sectional view of the pinion shown in Fig. 1 and illustrates the coupling means employed for connecting the pinion to the driving or driven agent with which the transmission gearing is employed; and Fig. 3 is a sectional view along the line 3—3 of Fig. 2.

Referring to the drawings, the gearing illustrated consists of a pinion 4, a gear 5 with which the pinion meshes, a movable frame 6, on which the pinion is journaled, and a stationary frame 7, on which the frame 6 is mounted and on which the gear 5 is journaled. In Fig. 1 the gear 5 and its mounting frame 7 are shown broken away for convenience of illustration. The pinion 4, as illustrated, consists of a relatively long tubular member provided with two sets of gear teeth 8, which are spaced one from the other, are axially alined, and are similar in all respects, except that the teeth of one set may be oppositely disposed with relation to the teeth of the other set where inclined or spiral teeth are employed. The gear 5 is also provided with two sets of gear teeth, which are spaced one from the other and each of which is adapted to mesh with one of the separate sets of the teeth 8 of the pinion 4.

The coupling means illustrated consists of a shaft 9 which extends into and through the hollow interior of the pinion 4 and is adapted to be operatively connected, by any suitable means, to the driving agent of the gearing or the agent to be driven therefrom, as the case may be. While the shaft 9 shown, extends entirely through the pinion 4, it is rigidly connected thereto at a point intermediate the ends of the pinion and consequently the torsional deflect of both the pinion and the shaft is reduced.

As shown, the pinion is provided at a point midway between its ends with an interior shoulder 11 having a tapered face with pin receiving recesses 12 formed therein, and the shaft 9 is provided at a point intermediate its ends with an enlarged shoulder 13, which has a peripheral face tapered to correspond to the peripheral face of the shoulder 11, with which it is adapted to contact. Semi-circular pin receiving apertures 12' are provided in the peripheral face of the shoulder 13 and each is adapted to register with one of the apertures 12 formed in the pinion and to thereby provide a cylindrical, or, if desired, tapered aperture for the reception of a pin 14. An extension 15 is provided on the shaft 9 and may, if desired, be of reduced diameter, as illustrated. This extension is so proportioned, as to its length, that it projects beyond the pinion when the shoulder 13 is in engagement with the shoulder 11.

The operation of securing the shaft 9 to the pinion consists in inserting it into one end of the pinion and moving its shoulder 13 into engagement with the shoulder 11 of the pinion; then turning the shaft relatively to the pinion so that each recess 12' registers with one of the recesses 12 formed in the inner face of the pinion shoulder; and then inserting a pin 14 in each registering pair of recesses. These pins may be driven home in any suitable manner, and a reference to the drawings will show that the recesses 12 and 12' are preferably inclined with reference to the axis of the pinion for the purpose of facilitating the operation of introducing the pins. After the pins are in place, a washer 16 is slipped over the extension 15 of the shaft and is moved therealong until it engages the shoulder 13 and the ends of the pins 14. A sleeve 17 is provided for holding the washer in place and is adapted to be slipped over the extension 15 and moved into engagement with the washer 16. The sleeve is preferably of such length that, when in place against the washer, it is engaged by a cap or plug 18 which may be slipped over the end of the shaft 9 and be inserted into the end of the pinion. Any suitable means may be employed for holding the cap and also the sleeve in place, such, for example, as a nut 19, threaded on to the end of the extension 15.

With this construction the shaft 13 is rigidly secured to the pinion at an intermediate point and the torsional strains on the pinion are materially reduced and, if desired, a lighter construction may be employed for the pinion and also the shaft.

Any suitable means may be employed for coupling the free end of the shaft 9 to the apparatus to which it is adapted to be connected and the shaft will flex sufficiently to permit the pinion to move with its floating frame for the purpose of distributing the tooth pressures along the teeth of the intermeshing gears.

It will be understood that the point of connection between the shaft 9 and the pinion 4 may be at any suitable point along the pinion, and, if desired, may be midway between the sets of the gear teeth 8.

What I claim and desire to secure by Letters Patent is:

1. A gear having an axially alined central bore formed therein, and a shaft of less diameter than the bore projecting into it, and means for rigidly securing the shaft to the gear at a point midway between the ends of the gear, comprising pins located in coöperating recesses formed in a shoulder on the shaft and an internal shoulder on the gear, and means secured in place at the end of the gear for locking the pins within the coöperating recesses.

2. A gear comprising a continuous tubular member having two sets of gear teeth formed thereon and an axially alined central bore formed therein, a shaft of less diameter than the bore projecting into it, and means for rigidly securing said shaft to said member at a point intermediate one set of teeth.

3. A gear having an axially alined central bore formed therein, a relatively flexible shaft extending into the bore, and means for rigidly securing the shaft to the gear at a point intermediate the ends of the gear whereby the shaft is capable of flexing within said bore.

4. In a transmission gearing, intermeshing gears, one of which is angularly movable with relation to the axis of the other and is provided with an axially extending central bore, a shaft of less diameter than said bore projecting into it, and means for rigidly securing the end of the shaft to the gear at a point intermediate the ends of the gear.

In testimony whereof, I have hereunto subscribed my name this twenty-first day of November, 1913.

GEO. WESTINGHOUSE.

Witnesses:
A. G. UPTEGRAFF,
R. E. ROGERS.